(12) United States Patent
Niemietz

(10) Patent No.: US 7,464,972 B1
(45) Date of Patent: Dec. 16, 2008

(54) AIR EVACUATION ATTACHMENT FOR FIRE HOSES

(76) Inventor: Roger D. Niemietz, 1021/2 Bee Alley, Cibolo, TX (US) 78108

( * ) Notice: Subject to any disclaimer, the term of this patent is extended or adjusted under 35 U.S.C. 154(b) by 0 days.

(21) Appl. No.: 11/396,787

(22) Filed: Apr. 1, 2006

Related U.S. Application Data

(60) Provisional application No. 60/667,424, filed on Apr. 1, 2005.

(51) Int. Cl.
*F16L 41/00* (2006.01)
*F16L 37/24* (2006.01)

(52) U.S. Cl. .................. 285/401; 285/126.1; 285/376

(58) Field of Classification Search ............ 285/136.1, 285/189, 126.1, 360, 376, 401, 7
See application file for complete search history.

(56) References Cited

U.S. PATENT DOCUMENTS

| | | | | |
|---|---|---|---|---|
| 1,681,363 A * | 8/1928 | Reddemann | ............... | 239/447 |
| 4,523,778 A * | 6/1985 | Ebert | ............... | 285/73 |
| 4,524,997 A * | 6/1985 | Ebert | ............... | 285/74 |
| 4,655,743 A * | 4/1987 | Hyde | ............... | 604/22 |
| 4,678,290 A * | 7/1987 | Welker | ............... | 359/367 |
| 4,886,303 A * | 12/1989 | Carson et al. | ............... | 285/99 |
| 5,091,656 A * | 2/1992 | Gahn | ............... | 307/119 |
| 5,244,459 A * | 9/1993 | Hill | ............... | 604/33 |
| 5,288,290 A * | 2/1994 | Brody | ............... | 604/32 |
| 5,324,255 A * | 6/1994 | Passafaro et al. | ............... | 604/22 |
| 5,486,025 A * | 1/1996 | Ketcham | ............... | 285/319 |
| 5,554,113 A * | 9/1996 | Novak et al. | ............... | 604/30 |
| 5,577,777 A * | 11/1996 | Singh et al. | ............... | 285/354 |
| 5,813,428 A * | 9/1998 | Almasy et al. | ............... | 137/218 |
| 6,282,442 B1 * | 8/2001 | DeStefano et al. | ............... | 604/21 |
| 6,910,495 B2 * | 6/2005 | Lafalce | ............... | 137/218 |
| 6,991,621 B2 * | 1/2006 | Bacher et al. | ............... | 604/247 |
| 2004/0154659 A1 * | 8/2004 | Lafalce | ............... | 137/218 |
| 2005/0056435 A1 * | 3/2005 | Price et al. | ............... | 169/52 |
| 2006/0231642 A1 * | 10/2006 | Matthews | ............... | 239/273 |

\* cited by examiner

*Primary Examiner*—James M Hewitt
(74) *Attorney, Agent, or Firm*—Kenneth L Tolar

(57) ABSTRACT

An air evacuation attachment for a fire hose includes an elongated conduit having an inlet and an opposing outlet. At the inlet is a Storz adaptor for coupling the conduit with a fire hose having a predetermined diameter. Storage tubes are provided along the length of the conduit each having a varying size Storz adaptor mounted thereon for interchangeably securing to the inlet to adapt the conduit to varying size fire hoses. The outlet includes internally disposed O-rings for tightly encompassing a vacuum hose. Accordingly, a fire hose can be conveniently connected to a vacuum source to remove excess air therefrom prior to storage.

5 Claims, 2 Drawing Sheets

AIR EVACUATION ATTACHMENT FOR FIRE HOSES

CROSS REFERENCE TO RELATED APPLICATIONS

This application is entitled to the benefit of provisional application No. 60/667,424 filed on Apr. 1, 2005, the specification of which is incorporated herein by reference.

BACKGROUND OF THE INVENTION

Long, large diameter hoses are used by most fire fighting services. Between uses, the hose is typically stacked and stored within a fire truck bed for rapid deployment. However, after each use, the lengthy hose almost always contains entrapped air which hinders storage. Furthermore, the inflated hose can easily become entangled and difficult to deploy, thereby contributing to loss of life and/or property. Additionally, precious storage space is needlessly occupied resulting in smaller hoses being transported on the vehicle. Accordingly, there is currently a need for a device that allows air to be quickly evacuated from a fire hose. A review of the prior art reveals a myriad of hose evacuating and drying devices. For example, U.S. Pat. No. 5,433,246 issued to Horton discloses a pressure coupling that allows an air pump to be connected to a water faucet to expel water from lines connected thereto.

U.S. Pat. No. 6,328,058 issued to Perrone, Jr. discloses a hose clearing device having a compressed air receiving valve and an attachment means for securing the valve assembly to a tube.

U.S. Pat. No. 3,845,779 issued to Greene, Jr. discloses a garden hose evacuating device.

U.S. Pat. No. 5,349,763 issued to Hafrenrichter et al. discloses an apparatus for drying fire hoses.

U.S. Pat. No. 5,191,722 issued to Nayyar et al. discloses a method and apparatus for drying fire hoses.

U.S. Pat. No. 6,591,744 issued to Peek discloses a wheeled squeegee for a fire hose.

None of the above referenced patents disclose a device that is uniquely designed to evacuate air from fire hoses. The present invention addresses this problem by providing a uniquely designed attachment that allows a vacuum source to be coupled with a fire hose to quickly and conveniently remove air from the hose after each use.

SUMMARY OF THE INVENTION

The present invention relates to an air evacuation attachment for a fire hose. The device comprises an elongated tubular conduit having an inlet and an opposing outlet. The inlet is equipped with a Storz adaptor for locking engagement with a fire hose fitting having a specific diameter. Storage tubes are provided along the length of the conduit that carry additional, varying diameter adapters for interchangeably attaching to the inlet. The outlet includes a plurality of O-rings positioned within the interior thereof for tightly encompassing a vacuum hose and a throat positioned upstream from the O-rings for limiting the insertion depth of the vacuum hose.

To remove excess air from a fire hose, a user connects a select one of the Storz adaptors to the inlet depending on the diameter of the hose. A hose from a vacuum source is inserted into the outlet until the vacuum hose engages the throat. The vacuum source is then activated until all excess air is removed from the fire hose. Accordingly, the evacuated fire hose can be flatly stored within a truck bed or similar location.

It is therefore an object of the present invention to provide a device that allows a user to easily remove excess air from a fire hose.

It is another object of the present invention to provide a device that can remove air from varying diameter hoses.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
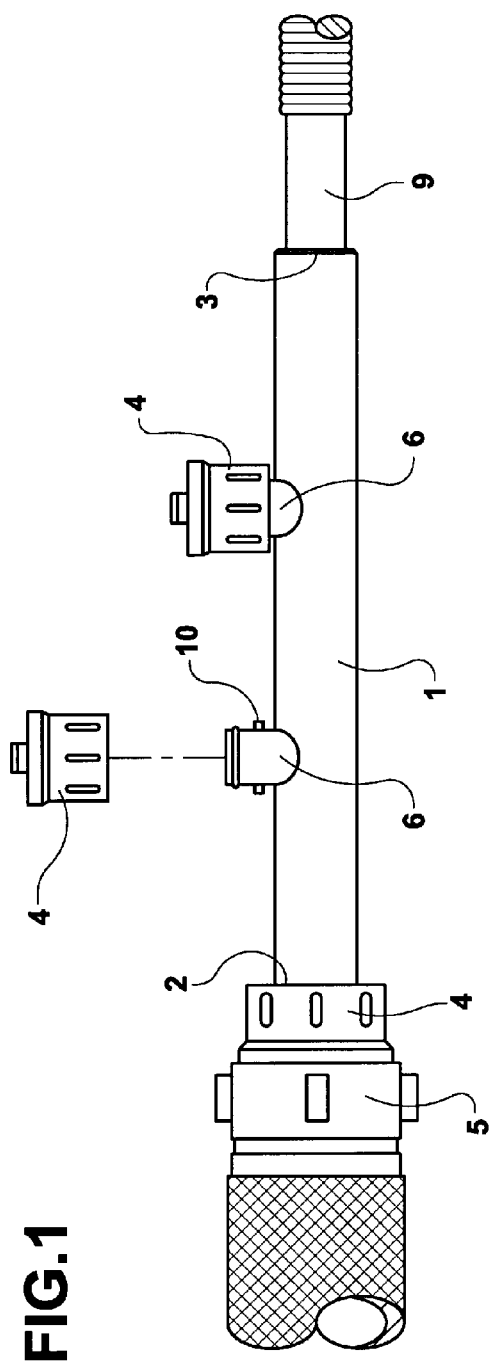
FIG. 1 is a front, plan view of the device coupled with a fire hose and vacuum source.
Figure 2:
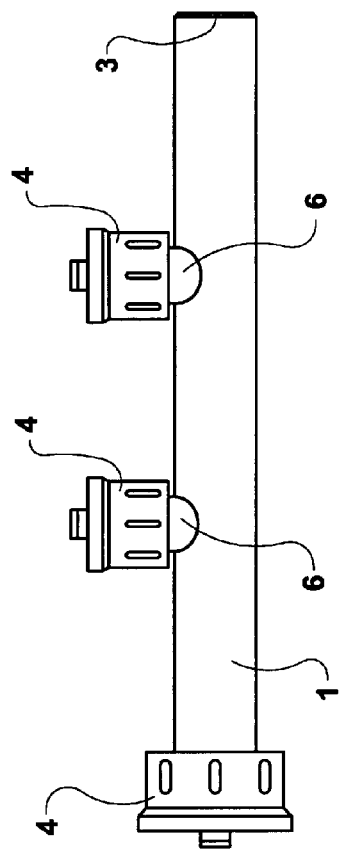
FIG. 2 is a front, plan view of the device.
Figure 3:
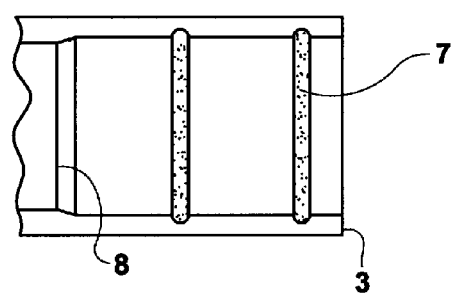
FIG. 3 is a detailed, cross-sectional view of the outlet.
Figure 5:
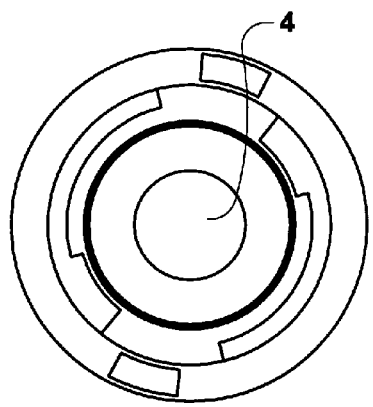
FIG. 5 is an end, plan view of a Storz adaptor.
Figure 4:
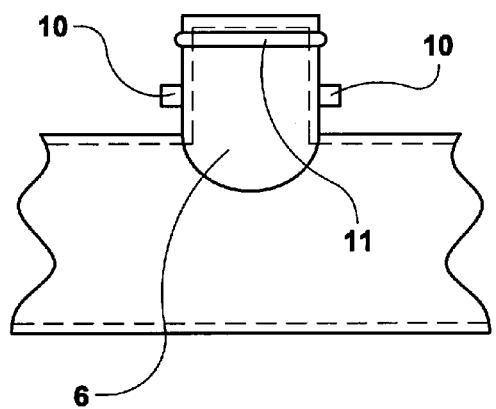
FIG. 4 is a detailed view of a conduit section and storage tube with a Storz adaptor removed therefrom.
Figure 6:
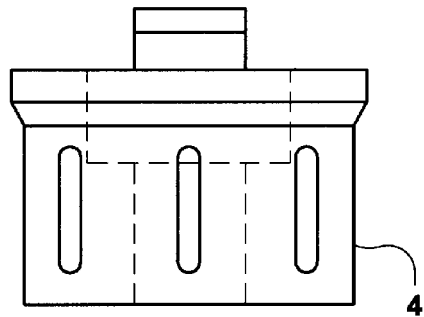
FIG. 6 is a side view of a Storz adaptor.

The present invention relates to an air evacuation attachment for a fire hose. The device comprises an elongated tubular conduit 1 having an inlet 2 at a first end and an outlet 3 at an opposing end. The inlet is equipped with a Storz adaptor 4 for locking engagement with a fire hose fitting 5 having a specific diameter. Integral, sealed storage tubes 6 are provided along the length of the conduit, each with a varying diameter Storz adaptor mounted thereon. Both the inlet and the storage tubes include a locking mechanism for removably retaining a Storz adapter. The locking mechanism includes a pair of diametrically opposed nipples 10 that fit within mating recesses on a lower end of each adapter. The adaptor is attached or removed by rotating it onto or off of the nipples in a conventional fashion. The storage tubes preferably include an O-ring 11 or a gasket that protects it when received within the adapter and which prevents the adapter from moving during transport.

The outlet includes a plurality of O-rings 7 positioned within the interior thereof for providing a tight seal between the conduit and a vacuum hose 9. The outlet also includes a throat 8 positioned upstream from the O-rings for limiting the insertion depth of the vacuum hose.

To remove excess air from a fire hose, a user connects a select one of the Storz adaptors to the inlet depending on the diameter of the hose to be evacuated. The vacuum hose 9 is inserted into the outlet until its distal end engages the throat. A vacuum source associated with the vacuum hose is then activated until all excess air is removed from the fire hose. Accordingly, the evacuated fire hose can be flatly stored within a truck bed or similar location. Any of the other size adapters not in use can be stowed on the storage tubes until needed.

The above described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The invention claimed is:

1. An air evacuation attachment for a fire hose comprising: an elongated tubular conduit having an inlet and an opposing outlet, said inlet having a Storz adaptor removably attached thereto for locking engagement with a mating fire hose fitting having a specific diameter, said outlet including a plurality of O-rings positioned within an interior thereof for providing a tight seal between a vacuum hose and the conduit, said outlet coupled with the vacuum hose whereby excess air is easily removed from a fire hose.

2. The air evacuation attachment according to claim 1 wherein said outlet further includes an internal throat positioned upstream from said O-rings for limiting the insertion depth of the vacuum hose.

3. The air evacuation attachment according to claim 1 further comprising a plurality of sealed storage tubes positioned on said conduit, each of said storage tubes adapted to removably carry a uniquely-sized Storz adapter allowing the conduit to be equipped with a plurality of varying size adapters that are interchangeably attachable to said inlet.

4. The air evacuation attachment according to claim 3 wherein said inlet and said storage tubes each include a locking mechanism for removably securing a Storz adapter.

5. The air evacuation attachment according to claim 4 wherein said locking mechanism includes a pair of diametrically-opposed nipples that fit within mating recesses on a lower end of said Storz adapter.

* * * * *